`US008737929B2`

(12) United States Patent
Cohen et al.

(10) Patent No.: US 8,737,929 B2
(45) Date of Patent: May 27, 2014

(54) DEVICE, SYSTEM AND METHOD OF ESTIMATING A PHASE BETWEEN RADIO-FREQUENCY CHAINS

(75) Inventors: Emanuel Cohen, Haifa (IL); Lior Kravitz, Kfar Bilu (IL)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 13/534,004

(22) Filed: Jun. 27, 2012

(65) Prior Publication Data
US 2014/0004801 A1    Jan. 2, 2014

(51) Int. Cl.
*H04B 17/00*    (2006.01)
(52) U.S. Cl.
USPC ..................................... 455/67.16; 455/67.11
(58) Field of Classification Search
USPC ......... 455/67.11, 67.16, 115.1, 101; 375/375, 375/373
See application file for complete search history.

(56) References Cited

U.S. PATENT DOCUMENTS

| 7,725,087 | B2 * | 5/2010 | Nielsen ...................... 455/114.3 |
| 7,773,967 | B2 * | 8/2010 | Smith ........................... 455/295 |
| 7,933,568 | B2 * | 4/2011 | Rofougaran et al. .......... 455/126 |
| 7,957,700 | B2 * | 6/2011 | Leukkunen et al. ....... 455/67.16 |
| 8,073,072 | B2 * | 12/2011 | Sun et al. ...................... 375/267 |
| 2011/0150119 | A1 * | 6/2011 | Kent et al. ..................... 375/267 |
| 2011/0274223 | A1 * | 11/2011 | Agarwal et al. ............... 375/345 |
| 2013/0343500 | A1 * | 12/2013 | Avivi et al. .................... 375/349 |

* cited by examiner

*Primary Examiner* — Sonny Trinh
(74) *Attorney, Agent, or Firm* — Shichrur & Co.

(57) ABSTRACT

Some demonstrative embodiments include devices, systems and/or methods of estimating a phase between radio-frequency (RF) chains. For example, an apparatus may include a power detector coupled between first and second RF chains; and a phase estimator to estimate a phase difference between the first and second RF chains based on a combined power value detected by the power detector responsive to simultaneous communication via both the first and second RF chains.

30 Claims, 7 Drawing Sheets

DEVICE, SYSTEM AND METHOD OF ESTIMATING A PHASE BETWEEN RADIO-FREQUENCY CHAINS

BACKGROUND

Some wireless communication devices include phased array antennas. For example, phased array antennas, e.g., in the form of compact silicon based phased array antennas, may be implemented for communication over a millimeter wave (mmWave) frequency band to provide high data rates at relatively low cost.

The phased array antennas may be sensitive to variations in manufacturing process, supply voltage, temperature (collectively referred to as "Process-Voltage-Temperature (PVT)"), and the like.

For example, a phased array antenna utilized for communication over the mmWave may be sensitive to PVT variations, e.g., compared to other implementations for communication over lower frequencies, e.g., due to proximity to a maximal oscillation frequency (fmax) and/or due to parasitic impact.

Building an accurate production testing-environment for the mmWave band may be very expensive.

Radio-Frequency (RF) testing of the phased array antenna may be performed by over-the-air (OTA) testing, which may be relatively complex.

Elaborate and/or expensive production-line calibrations may be required in order to measure and/or calibrate phase states of the phased array antenna.

Phase Shifter (PS) self test solutions may be based on using a down-converting receiver to convert an RF signal into in-phase and quadrature (IQ) components, sampling the IQ components, and analyzing the sampled components in a digital domain. Implementing such a solution for the mmWave band may require complex routing of local-oscillator (LO) signals at mmWave frequency, and/or may increase production cost. Phased array antennas may utilize multiple receive chains, e.g., at least eight receive chains, and separately performing down-conversion for each chain may further increase production cost.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
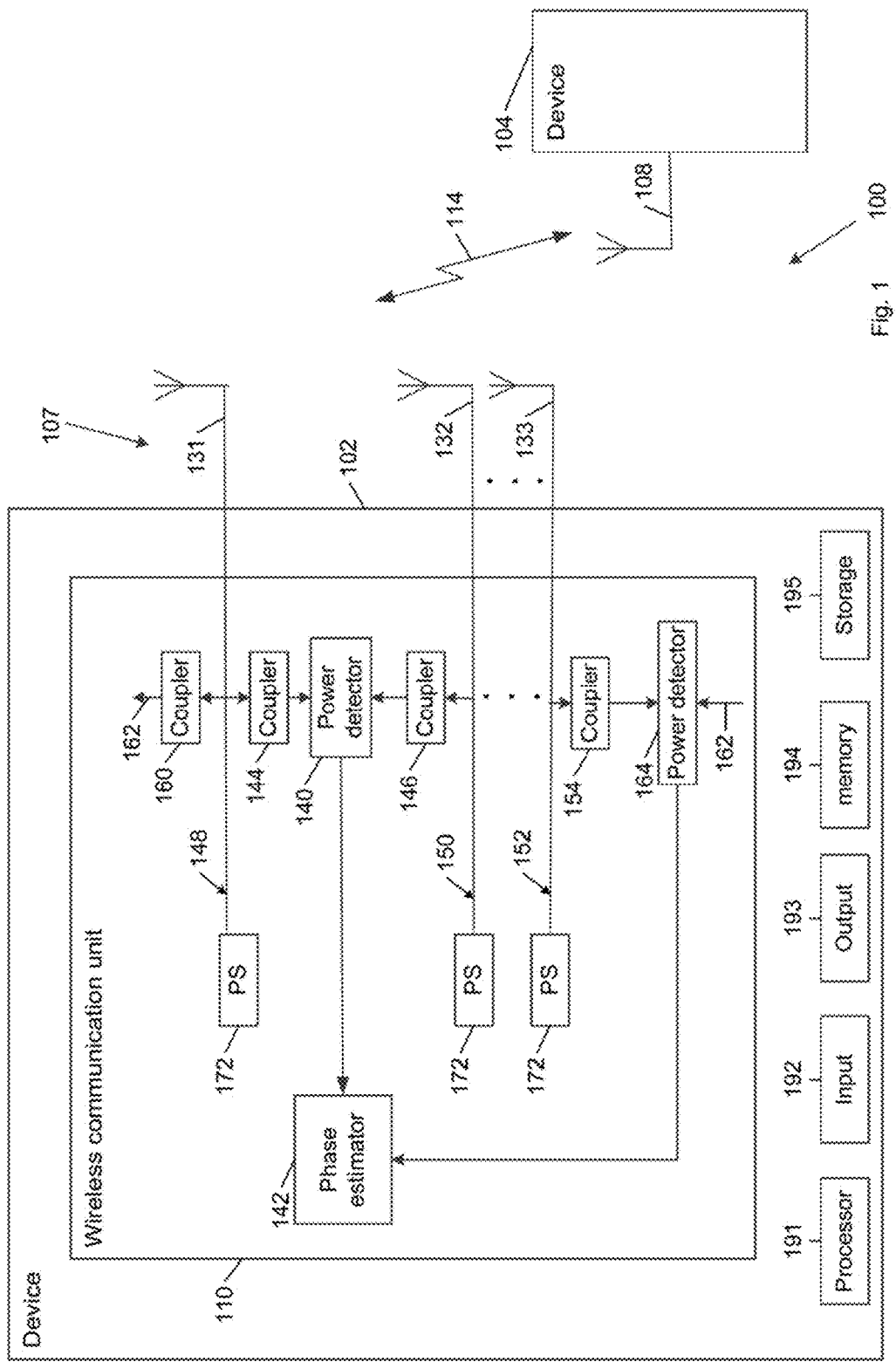
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.0, April 2010, Final specification) and/or future versions and/or derivatives thereof, devices and/or networks operating in accordance with existing IEEE 802.11 standards (IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; IEEE 802.11n-2009, IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput; IEEE802.11 task group ac (TGac) ("IEEE802.11-09/0308r12—TGac Channel Model Addendum Document"); IEEE 802.11 task group ad (TGad) (IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless-WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. In another example, communicating an RF signal over an RF chain may include transmitting the signal over an RF transmit (Tx) chain or receiving the signal over an RF receive (Rx) chain.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements.

The phrases "directional multi-gigabit (DMG)" and "directional band (DBand)", as used herein, may relate to a frequency band wherein the channel starting frequency is above 56 GHz.

The phrases "DMG STA" and "mmWave STA (mSTA)" may relate to a STA having a radio transmitter and/or receiver ("radio"), which is operating on a channel that is within the DMG band.

Reference is now made to FIG. 1, which schematically illustrates a block diagram of a system 100, in accordance with some demonstrative embodiments.

In some demonstrative embodiments, system 100 may include one or more wireless communication devices, e.g., wireless communication devices 102 and/or 104, capable of communicating content, data, information and/or signals over at least one suitable wireless communication channel 114, for example, a radio channel, an IR channel, a RF channel, a Wireless Fidelity (WiFi) channel, and the like. In one example, channel 114 may include a DMG channel. One or more elements of system 100 may optionally be capable of communicating over any suitable wired communication links.

In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, cellular telephone, a handset, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, a gaming device, an audio amplifier, a data source, a data sink, a Digital Still camera (DSC), a media player, a Smartphone, a television, a music player, an AP, a base station, or the like.

In some demonstrative embodiments, wireless communication devices 102 and/or 104 may perform the functionality of DMG stations. For example, wireless communication devices 102 and/or 104 may be configured to communicate over the DMG band.

In some demonstrative embodiments, devices 102 and/or 104 may communicate according to a beamforming scheme. For example, device 102 may include at least one phased array antenna 107, and device 104 may include at least one phased array antenna 108.

In some demonstrative embodiments, phased-array antennas 107 and/or 108 may each include a plurality of antenna elements configured to simultaneously emit and/or receive signals in accordance with the beamforming scheme.

In some demonstrative embodiments, phased array antenna 107 may include a transmit (Tx) phased array antenna and phased array antenna 108 may include a receive (Rx) phased array antenna. For example, phased array antenna 107 may be configured to form a beam directed in a particular direction of phased array antenna 108, e.g., by shifting phases of the signals emitted by the plurality of antenna elements of antenna 107. The phases of the signals emitted by the antenna elements may be shifted, for example, to provide a constructive and/or destructive interference configured to steer the beam in the particular direction. Phased array antenna 108 may be configured to receive the beam transmitted by phased array antenna 107, e.g., by shifting phases of the plurality of antenna elements of antenna 108, for example, to receive the steered beam from phased array antenna 107.

In some demonstrative embodiments, device 102 may also include an Rx phased array antenna and/or device 104 may also include a Tx phased array antenna.

In some demonstrative embodiments, devices 102 and/or 104 may implement transmit and receive functionalities using separate transmit and receive phased array antennas. In other embodiments, devices 102 and/or 104 may implement transmit and receive functionalities using common and/or integrated transmit/receive elements. For example, phased array antenna 107 may perform the functionality of both transmit and receive phased array antennas.

In some demonstrative embodiments, devices 102 and/or 104 may include a plurality of phase shifters (PSs) associated with the plurality of antenna elements of phased array antennas 107 and/or 108 to control the phase shifts applied by the plurality of antenna elements.

For example, wireless communication unit 110 may include a plurality of phase shifters 172 associated with the plurality of antenna elements of phased antenna array 107 to control the phase shifts applied by the plurality of antenna elements of phased antenna array 107. For example, each phase shifter 172 may shift the phase state of a respective antenna element of phased antenna array 107.

In some demonstrative embodiments, wireless communication unit 110 may include a plurality of RF chains connected to antenna elements 107. For example, as shown in FIG. 1, wireless communication unit 110 may include an RF chain 148 connected to an antenna element 131, an RF chain 150 connected to an antenna element 132 and/or an RF chain 152 connected to an antenna element 133. Wireless communication unit 110 may include any other number of RF chains and/or antenna elements, e.g., including one or more additional RF chains and/or antennas. The RF chains may include any suitable elements for handling RF signals, e.g., one or more amplifiers, filters, conductive paths, transmit lines, receive lines, and the like.

In some demonstrative embodiments, RF chains 148, 150 and/or 152 may include Tx RF chains, Rx RF chains and/or any combination of Rx and Tx chains.

In some demonstrative embodiments, the phase shifters 172 may include digital devices or analog devices, which are digitally controlled. Accordingly, phase shifters 172 may only be able to apply to antenna elements 107 phase states, which are selected from a predefined set of phase state values.

In some demonstrative embodiments, the number of phase state values may depend, for example, on a bit-size utilized by phase shifters 172 for representing the phase values. For example, a two-bit phase shifter may only be able to apply four phase state values, e.g., zero degrees (°), 90°, 180° and 270°.

In some demonstrative embodiments, wireless communication devices 102 and/or 104 may also include, for example, one or more of a processor 191, an input unit 192, an output unit 193, a memory unit 194, and a storage unit 195. Wireless communication devices 102 and/or 104 may optionally include other suitable hardware components and/or software components. In some demonstrative embodiments, some or all of the components of each of wireless communication devices 102 and/or 104 may be enclosed in a common housing or packaging, and may be interconnected or operably associated using one or more wired or wireless links. In other embodiments, components of each of wireless communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102 and/or 104 and/or of one or more suitable applications.

Input unit 192 includes, for example, a keyboard, a keypad, a mouse, a touch-pad, a track-ball, a stylus, a microphone, a touch-screen, and/or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, and/or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication device 102 and/or 104.

In some demonstrative embodiments, wireless communication unit 110 may include a phase estimator 142 to estimate a phase shift between one or more pairs of RF chains of wireless communication unit 110, e.g., as described in detail below.

In some demonstrative embodiments, phase estimator 142 may be configured to test and/or calibrate RF phase shift over the plurality of RF chains, e.g., based on the estimated phase shift.

For example, wireless communication unit 110 may include a built-in-self-test (BIST) architecture configured to estimate phase differences between RF chains of a plurality of pairs of RF chains, e.g., as described below.

In some demonstrative embodiments, phase estimator 142 may estimate a phase difference between first and second RF chains of a pair of RF chains based on a combined power responsive to simultaneous communication via both the first and second RF chains, e.g., as described below.

In some demonstrative embodiments, wireless communication unit 110 may include at least one power detector coupled between the first and second RF chains, e.g., as described below.

In some demonstrative embodiments, wireless communication unit 110 may include a plurality of power detectors coupled to a plurality of pairs of the RF chains.

In some demonstrative embodiments, the plurality of power detectors may be intermittently connected between the plurality of RF chains such that a power detector, e.g., each power detector, may be connected to a different pair of RF chains, and an RF chain, e.g., each of the RF chains, may be connected to two different power detectors.

In some demonstrative embodiments, the plurality of RF chains may include n>1 RF chains, and the plurality of power detectors may include n power detectors. An i-th power detector, i=1 . . . n−1, may be connected between an i-th RF chain and an RF chain i+1.

In some demonstrative embodiments, the n-th power detector may be connected between an n-th RF chain and a first RF chain.

For example, as shown in FIG. 1, wireless communication unit 110 may include a power detector 140 coupled between RF chain 148 and RF chain 150 and a power detector 154 coupled between RF chain 152 and RF chain 148.

In some demonstrative embodiments, wireless communication unit 110 may include a plurality of couplers to couple the power detectors to the RF chains. For example, wireless communication unit 110 may include a coupler 144 to couple RF chain 148 to power detector 140, a coupler 146 to couple RF chain 150 to power detector 140, a coupler 154 to couple RF chain 152 to power detector 164 and a coupler 160 to couple RF chain 148 to power detector 164, e.g., by providing power detector 164 with a signal 162 coupled from RF chain 148.

In some demonstrative embodiments, phase estimator 142 may estimate the phase difference between a pair of RF chains based on a combined power value detected by the power detector coupled to the pair of RF chains responsive to simultaneous communication via both the RF chains of the pair of RF chains.

For example, phase estimator 142 may estimate the phase difference between RF chains 148 and 150 based on a combined power value detected by power detector 140 responsive to simultaneous communication via both RF chains 148 and 150; and/or the phase difference between RF chains 152 and 148 based on based on a combined power value detected by power detector 164 responsive to simultaneous communication via both RF chains 152 and 148.

In some demonstrative embodiments, coupling the RF signals of the pair of RF chains to be detected by a common power detector may enable reducing and/or cancelling mismatch driven inaccuracies, e.g., as described below.

In some demonstrative embodiments, phase estimator 142 may calibrate the estimation of the phase difference between the pair of RF chains based on one or more measurements with respect to first and second RF chains of the pair of RF chains.

In some demonstrative embodiments, phase estimator 142 may calibrate the estimation of the phase difference between the pair of RF chains based on independent measurements corresponding to the first and second RF chains, e.g., as described below.

In some demonstrative embodiments, phase estimator 142 may estimate the phase difference between the first and second RF chains based on the combined power value and at least one chain power value detected by the power detector responsive to communication via only one of the first and second RF chains.

In some demonstrative embodiments, phase estimator 142 may estimate the phase difference between the first and second RF chains based on the combined power value, a first chain power value detected by the power detector responsive to communication via the first RF chain, and a second chain power value detected by the power detector responsive to transmission via the second RF chain, e.g., as described below.

In some demonstrative embodiments, phase estimator 142 may estimate a phase difference value corresponding to at least one phase state scheme applied to a pair of the RF chains, e.g., RF chains 148 and 150, based on a combination of first and second detected power values, which are detected by the power detector coupled to the pair of RF chains, e.g., power detector 140.

In some demonstrative embodiments, the first detected power value may include a power value detected by the power detector when a first set of two different phase states are applied to the first and second RF chains, respectively, e.g., as described below.

In some demonstrative embodiments, the second detected power value may include a power value detected by the power detector when a second set of two different phase states are applied to the first and second RF chains, respectively, e.g., as described below.

In one example, a first phase state scheme may include switching the first and second RF chains of the pair of RF chains to the same phase state. According to this example, the first set of phase states may include, for example, the phase states of zero degrees and 90 degrees, and/or the second set of phase states may include the phase states of 90 degrees and zero degrees, e.g., as described below.

In another example, a second phase state scheme may include switching the first and second RF chains to first and second different phase states, e.g., opposite phase states, which are separated by 180 degrees. According to this example, the first set of phase states may include the phase states of 90 degrees and 180 degrees, and/or the second set of phase states may include the phase states of 180 degrees and 90 degrees, e.g., as described below. The phase difference value corresponding to the second phase state scheme may be determined, for example, relative to a phase difference of ninety degrees.

Figure 2:
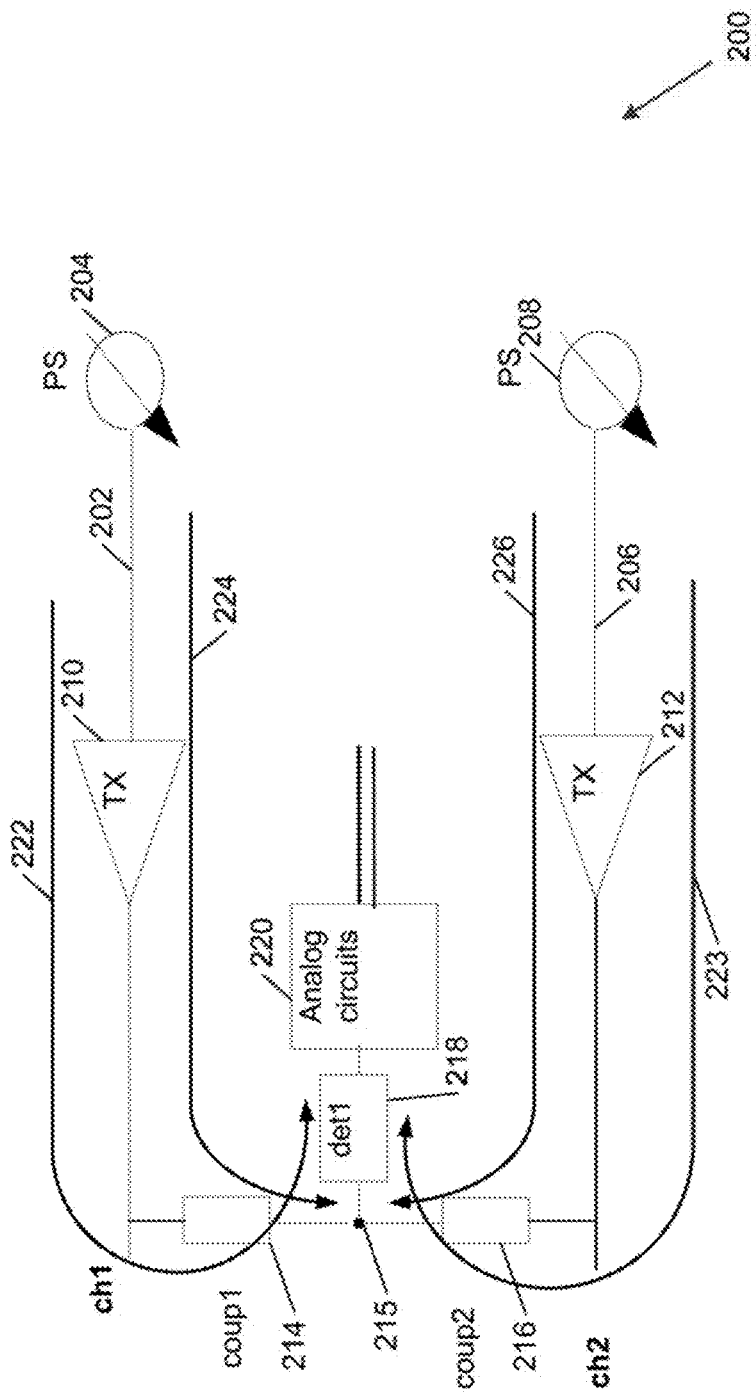
FIG. 2 is a schematic illustration of a phase estimation scheme, in accordance with some demonstrative embodiments.

Reference is made to FIG. 2, which schematically illustrates a phase estimation scheme 200 for estimating a phase difference between a pair of RF chains including a first RF chain 202 and a second RF chain 206, in accordance with some demonstrative embodiments. In some demonstrative embodiments, RF chains 202 and 206 may perform the functionality of RF chains 148 and 150 (FIG. 1), RF chains 152 and 148 (FIG. 1), and/or any other pair of RF chains of wireless communication unit 110 (FIG. 1).

In some demonstrative embodiments, RF chains 202 and 206 may include Tx chains. For example, RF chain 202 may include a Tx power amplifier (PA) 210 and/or RF chain 206 may include a Tx PA 212. In other embodiments, RF chains 202 and 206 may include Rx chains.

In some demonstrative embodiments, a PS 204 may control a phase state of RF chain 202 and a PS 208 may control a phase state of RF chain 206.

In some demonstrative embodiments, PS 204 and/or PS 208 may include a two-bit phase shifter configured to apply four phase states, e.g., 0°, 90°, 180° and 270°, to RF chains 202 and/or 206. In other embodiments, PS 204 and/or PS 208 may switch RF chains 202 and/or 206 between any other number and/or combination of phase states.

In some demonstrative embodiments, phase estimation scheme 200 may include a power detector 218 coupled to RF chain 202, e.g., via a coupler 214, and to RF chain 206, e.g., via a coupler 216. Both couplers 214 and 216 may have an output connected to a common point 215, such that an input to power detector 218 may include a combination of the outputs of couplers 214 and 216.

In some demonstrative embodiments, phase estimation scheme 200 may also include one or more circuits 220, e.g., analog circuits, to handle and/or process an output of power detector 218, e.g., as described below. In other embodiments circuits may include one or more digital circuits, e.g., a DSP and the like, and/or any combination of analog and digital circuits.

In some demonstrative embodiments, a calibration stage for calibrating phase estimation scheme 200 may include communicating a first calibration RF signal 222 via RF chain 202 and measuring by power detector 218 a first chain power value responsive to the communication of signal 222 via RF chain 202, e.g., while no signal is communicated via RF chain 206.

In some demonstrative embodiments, the calibration stage may include communicating a second calibration RF signal 223 via RF chain 206 and measuring by power detector 218 a second chain power value responsive to the communication of signal 223 via RF chain 206, e.g., while no signal is communicated via RF chain 202.

In some demonstrative embodiments, a phase estimating stage for estimating a phase difference between RF chains 202 and 206 may include simultaneously communicating RF signals via RF chains 202 and 206 and measuring by power detector 218 a combined power value responsive to the simultaneous communication via both RF chains 202 and 206. For example, an RF signal 224 and an RF signal 226 may be simultaneously communicated via RF chains 202 and 206, respectively; and power detector 218 may measure the combined power value, e.g., at point 215, responsive to the simultaneous communication of signals 224 and 226.

In some demonstrative embodiments, a phase difference between RF chains 202 and 206 may be estimated, e.g., by phase estimator 142 (FIG. 1), based on the first and second chain power values and the combined power value, e.g., as described below.

In some demonstrative embodiments, phase estimator 142 (FIG. 1) may estimate the phase difference, denoted a, between RF chains 202 and 206, for example, as follows:

$$\alpha = \cos^{-1}\left(\frac{V_\alpha - V_{ch1} - V_{ch2}}{2 \cdot \sqrt{V_{ch1} \cdot V_{ch2}}}\right) \quad (1)$$

wherein $V_\alpha$ denotes the combined power value measured by power detector 218 responsive to the simultaneous communication of signals 224 and 226, wherein $V_{ch1}$ denotes the first chain power value measured by power detector 218 responsive to the communication of signal 222 via RF chain 202, and wherein $V_{ch2}$ denotes the second chain power value measured by power detector 218 responsive to the communication of signal 223 via RF chain 206.

In some demonstrative embodiments, signals 222, 223, 224 and/or 226 may have substantially the same characteristics, e.g., signals 222, 223, 224 and/or 226 may be substantially identical.

In some demonstrative embodiments, Equation 1 may be rewritten as follows, e.g., assuming the chain power value $V_{ch1}$ is substantially equal to the chain power value $V_{ch2}$:

$$\alpha = 2 \cdot \cos^{-1}\left(\frac{1}{2}\sqrt{\frac{V_\alpha}{V_{ch1}}}\right) = 2 \cdot \cos^{-1}\left(\frac{1}{2}\sqrt{\frac{V_\alpha}{V_{ch2}}}\right) \quad (2)$$

In some demonstrative embodiments, an accuracy of the phase difference in accordance with a first estimation method ("method0") utilizing Equations 1 and/or 2 may be affected, e.g., reduced, at one or more phase state schemes applied to RF chains 202 and 206.

In one example, the estimated phase difference may have a reduced level of accuracy, when the same phase state is applied to RF chains 202 and 206, for example, when RF chains 202 and 206 have a phase difference of about 0°, e.g., when the phase states (0,0), (90,90), (180,180) and/or (270, 270) are applied to RF chains 202 and 206.

In another example, the estimated phase difference may have a reduced level of accuracy, when RF chains 202 and 206 have a phase difference of about 180°, e.g., when the phase states (0,180), (90,270), (180,0) and/or (270,90) are applied to RF chains 202 and 206.

In some demonstrative embodiments, there may be a relatively high error, e.g., of about 10°, when the phase difference a is about zero degrees, for example, if no RF mismatch occurs between simultaneous communication via both RF chains 202 and 206 and independent communication via one of the RF chains 202 and 206, e.g., for determining $V_{ch1}$ and/or $V_{ch2}$. An even greater error, e.g., of about 30°, e.g., may occur with a mismatch of 0.3 decibel (dB).

In some demonstrative embodiments, there may be a relatively high error, e.g., of about 10° for no mismatch and for a 0.3 dB mismatch, when the phase difference a is about 180 degrees.

In some demonstrative embodiments, the phase difference a may have the relatively high error at angles of about zero degrees, even if a relatively high level of signal-to-noise-ratio (SNR), e.g., 50 dB, may be achieved by a power detector, e.g., power detector 218, coupled to the two RF chains 202 and 206. The relatively high error level may result, for example, from a relatively low slope of Equation 1 at angles of about zero degrees.

In some demonstrative embodiments, the phase difference a may have the relatively high error at angles of about 180 degrees, even though Equation 1 may have a relatively high slope at angles of about 180 degrees, since the SNR may be relatively low, e.g., due to power cancellation between the opposite phases of the signals of both RF chains.

In some demonstrative embodiments, a 0.3 dB mismatch between simultaneous communication via both RF chains and independent communication via one of the RF chains may result in a further increase in the phase difference error.

In some demonstrative embodiments, the phase difference of at least one phase state scheme of RF chains 202 and 206 may be determined using another calculation ("method1"), e.g., different from the calculation represented by Equations 1 and 2.

The at least one phase state scheme may include a phase state scheme resulting in a relatively high phase difference error, e.g., when utilizing Equations 1 and/or 2.

In one example, the at least one phase state scheme may include switching RF chains 202 and 206 to the same phase state ("the 0 deg phase state scheme"), e.g., such that a phase difference between RF chains 202 and 206 is about zero degrees.

In another example, the at least one phase scheme may include switching RF chains 202 and 206 to "opposite" phase states ("the 180 deg phase state scheme"), e.g., such that a phase difference between RF chains 202 and 206 is about 180 degrees.

In some demonstrative embodiments, the phase difference between RF chains 202 and 206 at each of the 0 deg and/or the 180 deg phase state schemes may be determined indirectly, e.g., based on two separate measurements of combined power values, e.g., as described below.

In some demonstrative embodiments, the phase difference between RF chains 202 and 206 at the 0 deg phase state scheme may be determined based on a first combined power value detected by power detector 218 responsive to simultaneously communicating RF signals 224 and 226 via RF chains 202 and 206, respectively, when RF chain 202 is set to the phase state of zero degrees, and RF chain 206 is set to the phase state of 90 degrees; and a second combined power value detected by power detector 218 responsive to simultaneously communicating RF signals 224 and 226 via RF chains 202 and 206, respectively, when RF chain 202 is set to the phase state of 90 degrees, and RF chain 206 is set to the phase state of zero degrees.

In some demonstrative embodiments, the phase difference between RF chains 202 and 206 at the 180 deg phase state scheme may be determined, based on a first combined power value detected by power detector 218 responsive to simultaneously communicating RF signals 224 and 226 via RF chains 202 and 206, respectively, when RF chain 202 is set to the phase state of 90 degrees, and RF chain 206 is set to the phase state of 180 degrees; and a second combined power value detected by power detector 218 responsive to simultaneously communicating RF signals 224 and 226 via RF chains 202 and 206, respectively, when RF chain 202 is set to the phase state of 180 degrees, and RF chain 206 is set to the phase state of 90 degrees.

In some demonstrative embodiments, phase estimator 142 (FIG. 1) may estimate the phase difference between RF chains 202 and 206 at the 0 deg phase state scheme, e.g., based on the following Equations:

$$\varphi_p = \beta + \alpha_0 = \cos^{-1}\left(\frac{V_{90\_0} - V_{ch1} \cdot (F_{ch2} + F_{90})}{2 \cdot V_{ch1} \cdot \sqrt{F_{ch2} \cdot F_{90}}}\right) \quad (3)$$

$$\varphi_n = \beta - \alpha = \cos^{-1}\left(\frac{V_{0\_90} - V_{ch1} \cdot (1 - F_{ch2} \cdot F_{90})}{2 \cdot V_{ch1} \cdot \sqrt{F_{ch2} \cdot F_{90}}}\right) \quad (4)$$

wherein $\alpha_0$ denotes a detected phase difference between RF chains 202 and 206, when set to the same phase states, e.g. the states (0,0), (90,90), (180,180), or (270,270); wherein $\beta$ denotes a phase difference between two different states of the same chain, for example, states with a difference of 90 degrees ("the 90 deg phase state scheme"), e.g. the states (0,90), (90,180), (180,270), or (270,0); wherein $V_{90\_0}$ denotes the first combined power value detected by power detector 218 at the phase states (90,0); wherein $V_{0\_90}$ denotes the second combined power value detected by power detector 218 at the phase states (0,90); wherein $F_{ch2}$ denotes an amplitude factor difference between chains 202 and 206 at the same phase state; and wherein $F_{90}$ denotes an amplitude factor difference between two different states of the same chain, for example, states with a difference of 90 degrees, e.g. the states (0,90), (90,180), (180,270), or (270,0).

For example, the factor $F_{ch2}$ may be determined by measuring the power over each of chains 202 and 206 independently. The factor $F_{ch2}$ may be determined, for example, with respect to one of the phase states.

In some demonstrative embodiments, the factor $F_{90}$ may be determined by measuring the power over each of chains 202 and 206 independently, e.g., for each of the phase states.

For example, the phase differences $\alpha_0$ and/or $\beta$ may be determined based on Equations 3 and 4, e.g., as follows:

$$\alpha_0 = \left(\frac{\varphi_p - \varphi_n}{2}\right) \quad (5)$$

$$\beta = \left(\frac{\varphi_p + \varphi_n}{2}\right) \quad (6)$$

In some demonstrative embodiments, it may be assumed that phase shifts of two neighbor RF chains, e.g., chains 202 and 206, are the same for a particular phase state. For example, simulations may show a reduced mismatch of about 1 degree. According to this assumption, a combined power value, denoted $V_{0\_0}$, detected by power detector 218 at the phase states (0,0) of the 0 deg phase state scheme may be represented, e.g., as follows:

$$V_{0\_0} = V_{ch1}(1 + F_{ch2}) + 2 \cdot V_{ch1} \cdot \sqrt{F_{ch2}} \cdot \cos\left(\frac{\varphi_p - \varphi_n}{2}\right) \quad (7)$$

In some demonstrative embodiments, Equation 7 may be rewritten to represent the first chain power value $V_{ch1}$ as a function of the combined power values $V_{0\_0}$, $V_{90\_0}$ and $V_{0\_90}$, e.g., as follows:

$$V_{ch1} = f(V_{0\_0}, V_{90\_0}, V_{0\_90}) \qquad (8)$$

In some demonstrative embodiments, Equation 8 may be substituted in Equations 3 and 4. According to these embodiments, another calculation ("method2") may include determining the phase differences $\alpha_0$ and/or $\beta$ based on the combined power values $V_{0\_0}$, $V_{90\_0}$ and $V_{0\_90}$, e.g., without the need to measure the first chain power value $V_{ch1}$. Accordingly, the phase differences $\alpha_0$ and/or $\beta$ may be determined, while eliminating the sensitivity to the $V_{ch1}$ mismatch discussed above.

In a similar manner, phase estimator 142 (FIG. 1) may estimate the phase difference between RF chains 202 and 206 at the 180 deg phase state scheme, e.g., based on the following Equations:

$$\varphi_p = \beta + \alpha_0 = \cos^{-1}\left(\frac{V_{180\_90} - V_{ch1} \cdot (F_{ch2} + F_{90})}{2 \cdot V_{ch1} \cdot \sqrt{F_{ch2} \cdot F_{90}}}\right) \qquad (9)$$

$$\varphi_n = \beta - \alpha_0 = \cos^{-1}\left(\frac{V_{90\_180} - V_{ch1} \cdot (1 - F_{ch2} \cdot F_{90})}{2 \cdot V_{ch1} \cdot \sqrt{F_{ch2} \cdot F_{90}}}\right) \qquad (10)$$

In some demonstrative embodiments the 90 degree difference may be utilized as an "intermediate" phase state for determining the phase difference for the 0 deg and/or 180 deg phase state schemes, e.g., since the 90 degree phase difference may provide a relatively high degree of accuracy and/or since 90 degrees may be the smallest available phase step for some implementations, e.g., 2-bit phase state implementations. However in other embodiments, any other "intermediate" phase difference may be utilized. For example, in systems utilizing at least 3-bt phase states, any other phase state difference may be used.

Figure 3:
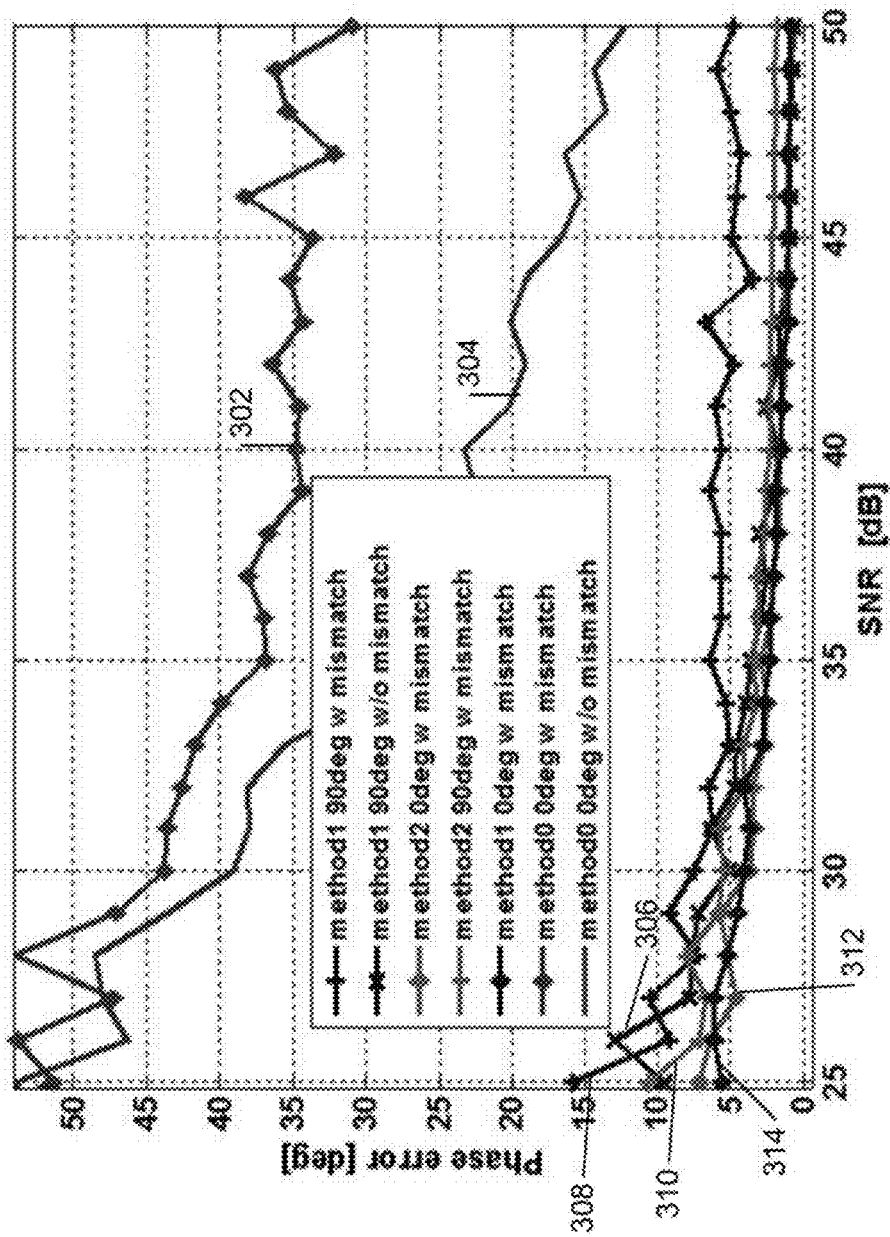
FIG. 3 is a schematic illustration of a graph including curves depicting errors of an estimated phase between two RF chains versus a SNR of a power detector coupled to the two RF chains, in accordance with some demonstrative embodiments.

Reference is made to FIG. 3, which schematically illustrates a graph including curves 302, 304, 306, 308, 310, 312 and 314 depicting errors of an estimated phase between two RF chains versus a SNR of a power detector coupled to the two RF chains, corresponding to seven respective phase estimation implementations, in accordance with some demonstrative embodiments.

Curve 302 depicts the estimation error, when estimating the phase difference between RF paths 202 and 206 (FIG. 2) at the 0 deg phase state scheme according to method0, e.g., using Equations 1 and/or 2, with a mismatch of 0.3 dB.

Curve 304 depicts the estimation error, when estimating the phase difference between RF paths 202 and 206 (FIG. 2) at the 0 deg phase state scheme according to method0, e.g., using Equations 1 and/or 2, without mismatch.

Curve 308 depicts the estimation error, when estimating the phase difference between RF paths 202 and 206 (FIG. 2) at a phase scheme (the 90 deg phase state scheme), in which a phase difference between RF chains 202 and 206 (FIG. 2) is about 90 degrees, according to method1, e.g., using Equations 3, 4, 5 and/or 6, with a mismatch of 0.3 dB.

Curve 306 depicts the estimation error, when estimating the phase difference between RF paths 202 and 206 (FIG. 2) at the 90 deg phase state scheme according to method1, e.g., using Equations 3, 4, 5 and/or 6, without mismatch.

Curve 310 depicts the estimation error, when estimating the phase difference between RF paths 202 and 206 (FIG. 2) at the 90 deg phase state scheme according to method2, e.g., using Equation 8, with a mismatch of 0.3 dB.

Curve 312 depicts the estimation error, when estimating the phase difference between RF paths 202 and 206 (FIG. 2) at the 0 deg phase state scheme according to method2, e.g., using Equation 8, with a mismatch of 0.3 dB.

Curve 314 depicts the estimation error, when estimating the phase difference between RF paths 202 and 206 (FIG. 2) at the 0 deg phase state scheme according to method1, e.g., using Equations 3, 4, 5 and/or 6, with a mismatch of 0.3 dB.

A shown in FIG. 3, the estimation error may be reduced to about 1-2 degrees at the 0 deg phase state scheme, e.g., without substantial sensitivity to mismatch.

As also shown in FIG. 3, the phase difference between RF chains 202 and 206 (FIG. 2) may be estimated for the 90 deg phase state scheme using method1, e.g. if the mismatch is low, or using method2, e.g., for higher mismatch.

As also shown in FIG. 3, the phase difference between RF chains 202 and 206 (FIG. 2) may be estimated for the 180 deg phase state scheme using the phase states (90,180) and method2. Utilizing method2 may enable maintaining an SNR level of 35 dB, thereby reducing a dynamic range needed from power detector 218 (FIG. 1), while ensuring linearity for phase reading.

Figure 4:
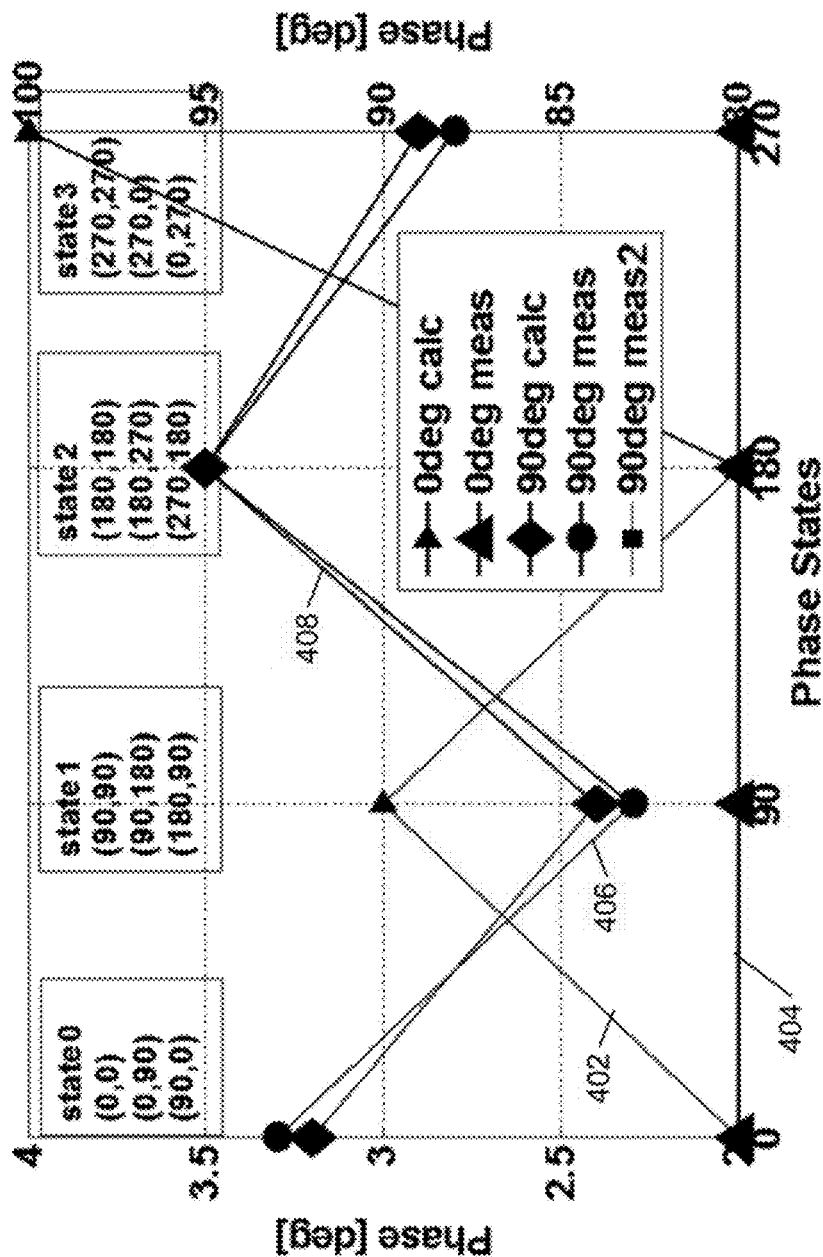
FIG. 4 is a schematic illustration of a graph including curves depicting reference and calculated phase differences between a pair of RF chains versus four predefined phase state modes, in accordance with some demonstrative embodiments.

Reference is made to FIG. 4, which schematically illustrates a graph including four curves depicting reference and calculated phase difference values between a pair of RF chains, e.g., RF chains 202 and 206 (FIG. 2), versus four predefined phase state modes, in accordance with some demonstrative embodiments. A right-hand vertical axis of FIG. 4 represents values of the phase difference $\beta$ and a left-hand vertical axis of FIG. 4 represents values of the phase difference $\alpha_0$.

A curve 402 depicts calculated values of the phase difference $\alpha_0$ with respect to a first phase state mode, in which the phase difference $\alpha_0$ relates to the phase states (0,0) and the phase difference $\beta$ relates to the phase states (0,90) and (90, 0); a second phase state mode, in which the phase difference $\alpha_0$ relates to the phase states (90,90) and the phase difference $\beta$ relates to the phase states (90,180) and (180,90); a third phase state mode, in which the phase difference $\alpha_0$ relates to the phase states (180,180) and the phase difference $\beta$ relates to the phase states (180,270) and (270,180); and a fourth phase state mode, in which the phase difference $\alpha_0$ relates to the phase states (270,270) and the phase difference $\beta$ relates to the phase states (270,0) and (0,270). The values of curve 402 may be estimated, for example, using Equations 3, 4, 5, 6 and/or 8, e.g., as described above.

A curve 404 depicts reference values of the phase difference between RF paths 202 and 206 (FIG. 2) when set to the same phase state, with respect to the first, second third and fourth phase state modes. The reference values of curve 404 may be measured, for example, by external measurement and/or calibration equipment.

A curve 408 depicts calculated values of the phase difference $\beta$ with respect to the first, second third and fourth phase state modes. The values of curve 408 may be estimated, for example, using Equations 3, 4, 5, 6 and/or 8, e.g., as described above.

A curve 406 depicts reference values of the phase difference between RF paths 202 and 206 (FIG. 2) when set to the phase states having a difference of 90 degrees, with respect to the first, second third and fourth phase state modes. The reference values of curve 406 may be measured, for example, by external measurement and/or calibration equipment.

As shown in FIG. 4, the estimated phase difference values of curve 408 substantially match the reference phase difference values of curve 406. The estimated phase difference values of curve 402 have an error of up to 2 degrees with respect to the reference phase difference values of curve 404.

In some demonstrative embodiments, phase difference values corresponding to all possible phase states of RF paths 202 (FIG. 2) and 206 (FIG. 2) may be estimated using all or only some of the four phase state modes.

For example, the phase differences $\alpha_0$ and $\beta$ may be estimated for the first and second phase state modes, e.g., in order to estimate the phase difference corresponding to 0 deg and 180 deg. An additional estimation for the third and fourth states may enable reducing an estimation error, e.g., by averaging the phase difference corresponding to 0 deg and 180 deg.

In some demonstrative embodiments, the phase differences $\alpha_0$ and $\beta$ may be estimated for three phase state modes, e.g., in order to more accurately estimate two adjacent phase points. According to these embodiments, if four phase states are utilized, e.g., the phase states of 0, 90, 180 and 270 degrees, an estimation cycle may include estimating the phase difference for the 0 deg phase state scheme and the 90 deg phase state scheme, e.g., by measuring the phase differences for the phase states (0,0), (0,90), (90,0); estimating the phase difference for the 90 deg phase state scheme and the 180 deg phase state scheme, e.g., by measuring the phase differences for the phase states (90,90), (90,180), (180,90); and estimating the phase difference for the 180 deg phase state scheme and the 270 deg phase state scheme, e.g., by measuring the phase differences for the phase states (180, 180), (180,270), (270,180). It is noted, that this cycle may have some level of redundancy, which may provide a greater degree of accuracy, e.g., via averaging. Another estimation cycle may not have redundancy, e.g., if estimation is performed with respect to only some of the phase states, e.g., only seven of the nine phase states listed above, for example, by excluding the measurement of the phase differences for the phase states (180,180), (180,270) and/or (270,180).

Figure 5:
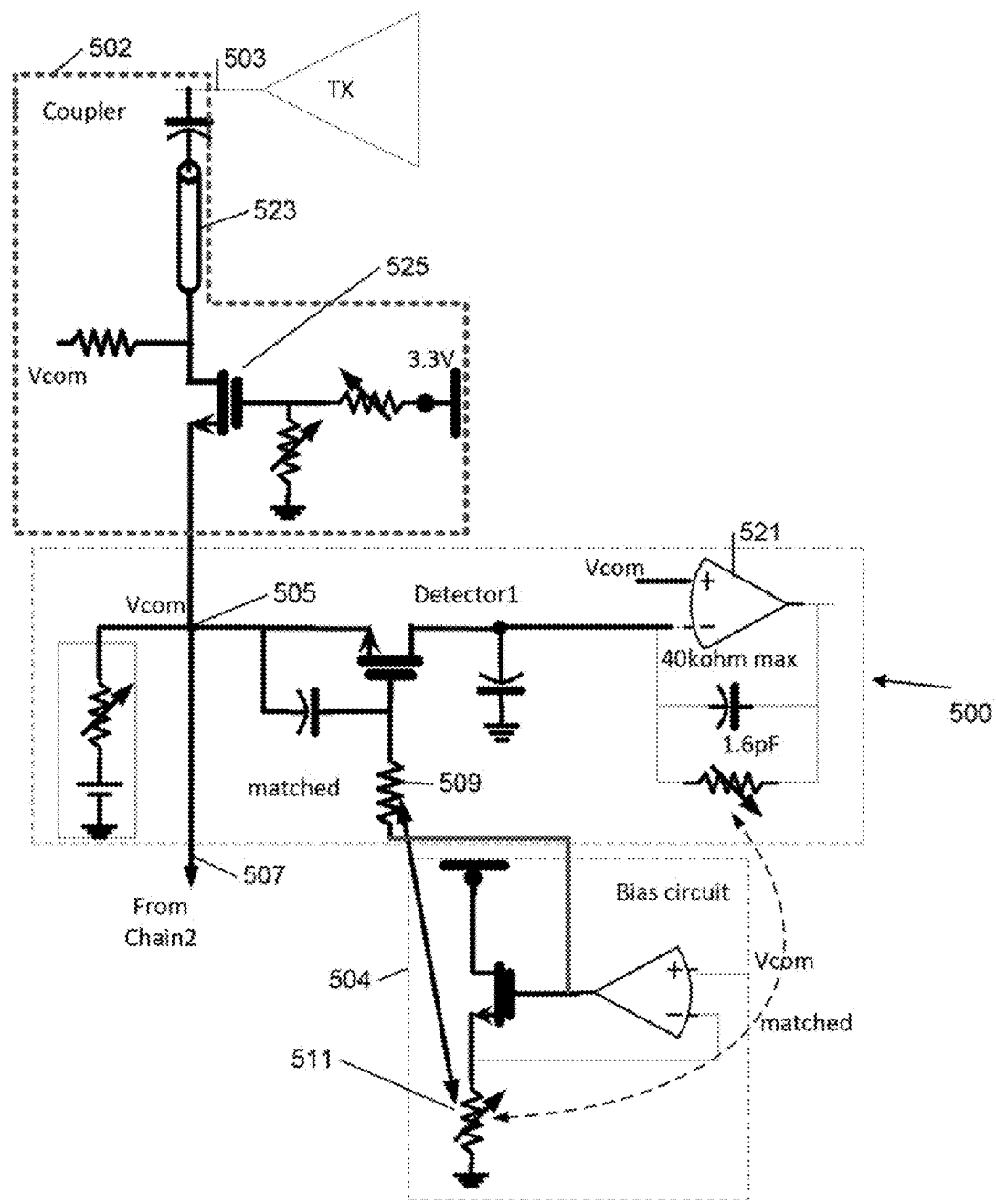
FIG. 5 is a schematic illustration of power detector, in accordance with some demonstrative embodiments.

Reference is made to FIG. 5, which schematically illustrates a power detector 500, in accordance with some demonstrative embodiments. In some demonstrative embodiments, power detector 500 may perform the functionality of power detector 140 (FIG. 1), power detector 164 (FIG. 1) and/or power detector 218 (FIG. 2).

In some demonstrative embodiments, power detector 500 may be coupled to first and second RF chains ("the combined chains"). For example, a first RF chain 503 may be coupled to detector 500 via a coupler 502, e.g., as described above with reference to FIGS. 1 and/or 2. Another coupler (not shown) similar to coupler 502 may be implemented to couple an RF signal 507 of a second RF chain to power detector 500, e.g., at a common input point 505.

In some demonstrative embodiments, power detector 500 may include a coupler bias circuit 504, an Operational Amplifier (OPA or OP-Amp) 521, and matched transistors 509 and 511.

In some demonstrative embodiments, coupler 502 may include a switched coupler configured to combine an RF signal from the combined chains, e.g., while maintaining low loss and/or minimal loading on the combined chains, for example, in order to improve the sensitivity of detector 500 and/or to allow a relatively long distance between the combined chains.

In some demonstrative embodiments, coupler 502 may include a coupling line 523 configured to reduce, e.g., minimize, PA loading. For example, coupling line 523 may include a high impedance line, e.g., in the form of a thin microstrip line on low metal level. Coupling line 523 may be shielded by upper metal ground, and may not interfere with other structures of detector 500.

In some demonstrative embodiments, coupler 502 may also include a series switch 525 between coupling line 523 and detector 500. For example, switch 525 may be switched off to disconnect detector 500 from chain 503, for example, in order to reduce, e.g., minimize, loss of chain 503, for example, when no power detection is to be performed. Switch 525 may be switched on to connect detector 500 to chain 503, e.g., while maintaining a high degree of coupling.

In some demonstrative embodiments, power detector 500 may be robust versus variations in manufacturing process, supply voltage, temperature (collectively referred to as "Process-Voltage-Temperature (PVT)"), and the like. For example, power detector 500 may utilize a constant current implementation, for example, by providing a constant Vcom voltage to OPA 521 and maintaining resistor 511 at constant resistance, e.g., to reduce sensitivity to process variation. Additionally or alternatively, a current gain resistor 509 of OPA 521 may be matched to a resistor 511 of bias circuit 504, e.g., to reduce impact of resistor variation. Additionally, the detector bias current and/or voltage gain may be controllable.

In some demonstrative embodiments, power detector 500 may have a size of about 150 micrometer (um) by 150 um. Power detector 500 may have, for example, a power consumption of less than 1 milliampere (mA).

Figure 6:
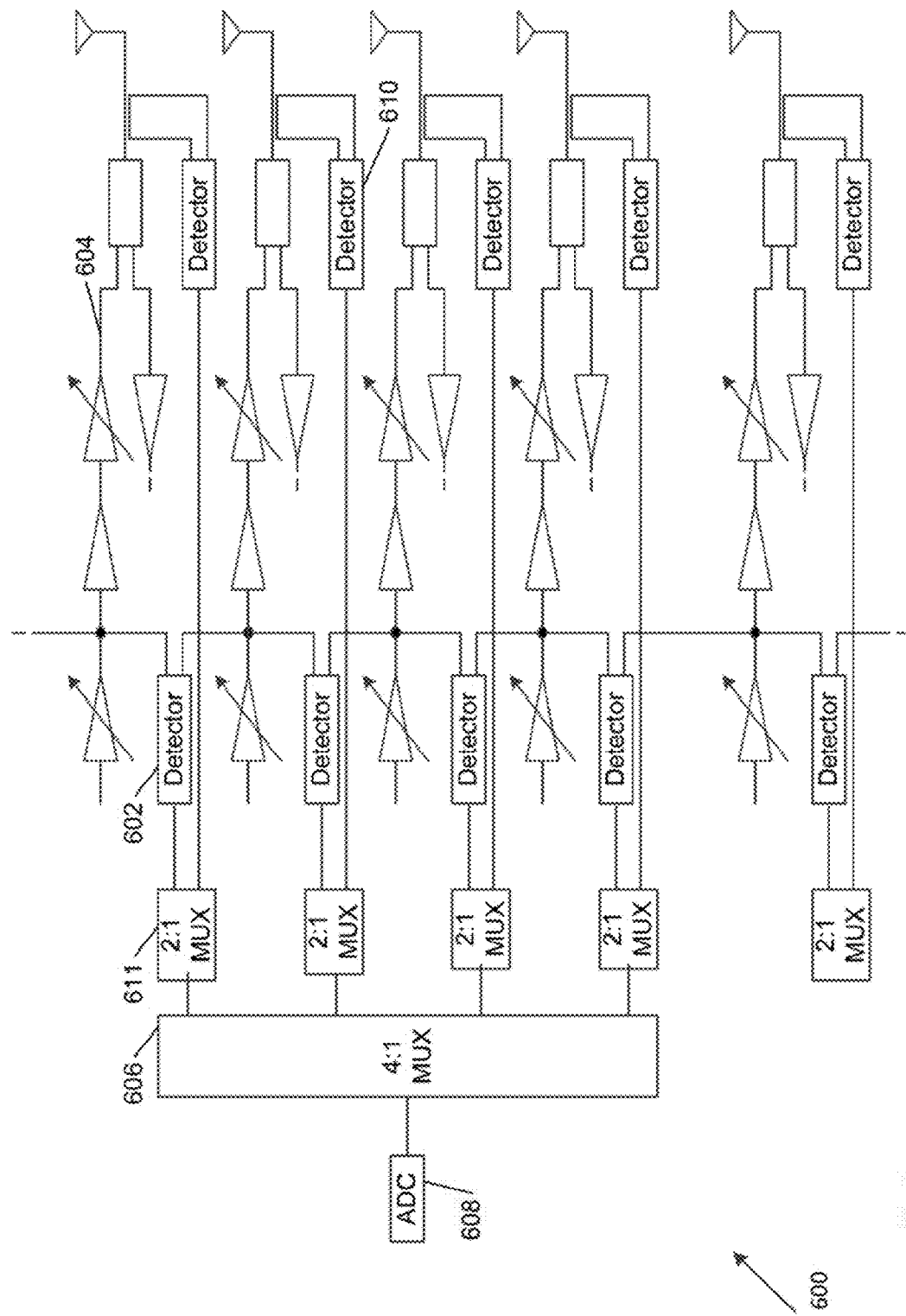
FIG. 6 is a schematic illustration of a built-in-self-test (BIST) architecture for estimating phases between a plurality of RF chains, in accordance with some demonstrative embodiments.

Reference is now made to FIG. 6, which schematically illustrates a built-in-self-test (BIST) architecture 600 for estimating phases between a plurality of RF chains, in accordance with some demonstrative embodiments. In some demonstrative embodiments, BIST architecture 600 may be implemented by wireless communication unit 110 (FIG. 1).

In some demonstrative embodiments, BIST architecture 600 may include a plurality of power detectors 602 coupled to a plurality of pairs of the RF chains 604.

In some demonstrative embodiments, the plurality of power detectors 602 may be intermittently connected between the plurality of RF chains 604 such that a power detector 602, e.g., each power detector 602, may connected to a different pair of RF chains 604, and an RF chain 604, e.g., each of the RF chains 604, may be connected to two different power detectors 602.

In some demonstrative embodiments, the plurality of RF chains 604 may include n>1 RF chains 604, and the plurality of power detectors 602 may include n power detectors 602. An i-th power detector 602, i=1 . . . n−1, may be connected between an i-th RF chain and an RF chain i+1.

In some demonstrative embodiments, the n-th power detector 602 may be connected between an n-th RF chain 604 and a first RF chain 604.

In some demonstrative embodiments, the plurality of power detectors 602 may be concatenated via a plurality of multiplexers 606. For example, a multiplexer 606 may multiplex between four power detectors 602.

In some demonstrative embodiments, the relative phase between two RF chains 604 may be extracted by a common power detector 602, e.g., in a sequential manner, e.g., until measuring the combined power values corresponding to the relative phases of the all RF chains 604 that are needed for testing.

In some demonstrative embodiments, power detectors 602 may convert the measured signal into a DC voltage, e.g., relative to an input power level, which may then sampled by an Analog to Digital Converter (ADC) 608, e.g., through multiplexers 606. This scheme may be beneficial, e.g., compared to an I/Q conversion solution, which may require an ADC that samples a wide-band signal.

In some demonstrative embodiments, BIST architecture may be configured to detect a power over RF chains 604, e.g., using a plurality of power detectors 610. Power detectors 610 may be connected via a plurality of multiplexers 611 to ADC 608.

Figure 7:
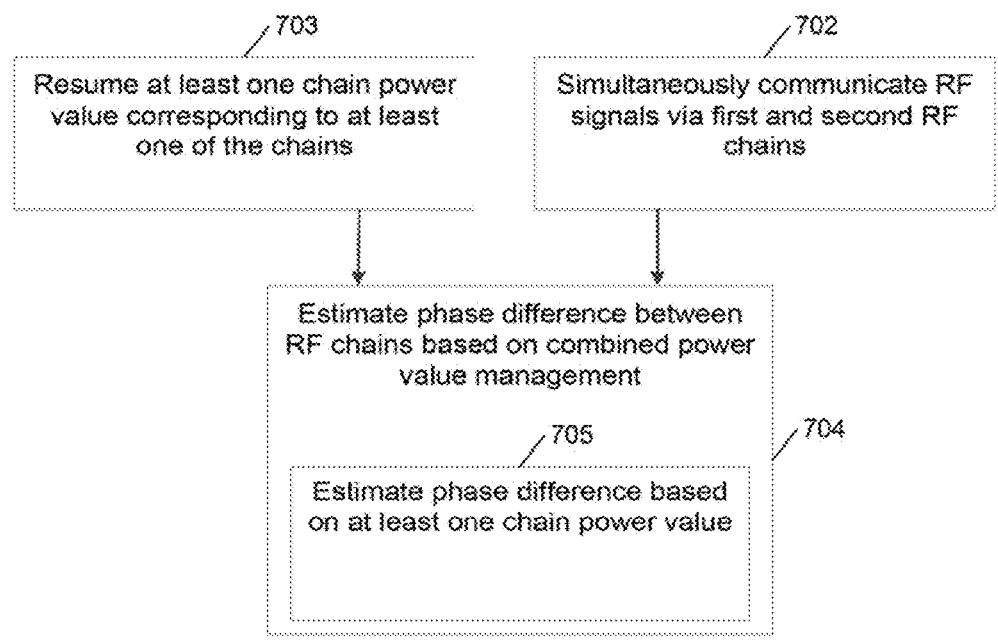
FIG. 7 is a schematic flow-chart illustration of a method of estimating a phase between RF chains, in accordance with some demonstrative embodiments.

Reference is made to FIG. 7, which schematically illustrates a method of estimating a phase between RF chains, in accordance with some demonstrative embodiments. In some embodiments, one or more of the operations of the method of FIG. 7 may be performed by a wireless communication system, e.g., system 100 (FIG. 1), a wireless communication device, e.g., device 102 (FIG. 1), a wireless communication unit, e.g., wireless communication unit 110, and/or a phase estimator, e.g., phase estimator 142 (FIG. 1).

As indicated at block 702, the method may include simultaneously communicating a radio-frequency signal via first and second RF chains. For example, RF signals 224 (FIG. 2) and 226 (FIG. 2) may be simultaneously communicated via RF chains 202 (FIG. 2) and 206 (FIG. 2), respectively, e.g., as described above.

As indicated at block 704, the method may include estimating a phase difference between the first and second RF chains based on a combined power value detected by a power detector, which is coupled between the first and second RF chains, responsive to the simultaneous communication via both the first and second RF chains. For example, phase estimator 142 (FIG. 1) may estimate the phase difference between RF chains 202 and 206 (FIG. 2), e.g., based on the combined power measured by power detector 218 (FIG. 2) responsive to signals 224 (FIG. 2) and 226 (FIG. 2), e.g., as described above.

As indicated at block 703, the method may include measuring at least one chain power value responsive to communication via only one of the first and second RF chains. For example, power detector 218 (FIG. 2) may measure at lest one of the first chain power value detected responsive to communication via RF chain 202 (FIG. 2), and the second chain power value detected responsive to communication via RF chain 206 (FIG. 2), e.g., as described above.

As indicated at block 705, estimating the phase difference between the first and second RF chains may include estimating the phase difference based on the combined power value and the at least one chain power value. For example, phase estimator 142 (FIG. 1) may estimate the phase difference between RF chains 202 and 206 (FIG. 2), based on the combined power and the first and second chain power values, e.g., as described above.

Figure 8:
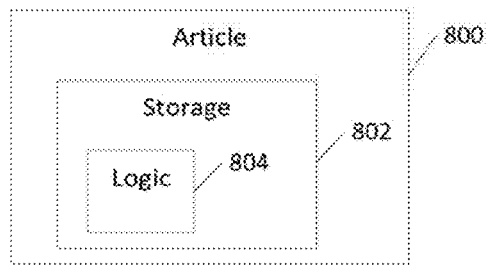
FIG. 8 is a schematic illustration of an article of manufacture, in accordance with some demonstrative embodiments.

Reference is made to FIG. 8, which schematically illustrates an article of manufacture 800, in accordance with some demonstrative embodiments. Article 800 may include a non-transitory machine-readable storage medium 802 to store logic 804, which may be used, for example, to perform at least part of the functionality of device 102 (FIG. 1), wireless communication unit 110 (FIG. 1), and/or phase estimator 142 (FIG. 1) and/or to perform one or more operations of the method of FIG. 7. The phrase "non-transitory machine-readable medium" is directed to include all computer-readable media, with the sole exception being a transitory propagating signal.

In some demonstrative embodiments, article 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a power detector coupled between first and second radio-frequency (RF) chains; and
   a phase estimator to estimate a phase difference between said first and second RF chains based on a combined power value detected by the power detector responsive to simultaneous communication via both the first and second RF chains.

2. The apparatus of claim 1, wherein said phase estimator is to estimate said phase difference based on the combined power value and at least one chain power value detected by the power detector responsive to communication via only one of the first and second RF chains.

3. The apparatus of claim 2, wherein said at least one chain power value comprises a first chain power value detected by the power detector responsive to communication via the first RF chain, and a second chain power value detected by the power detector responsive to communication via the second RF chain.

4. The apparatus of claim 1, wherein said RF chains are switchable between a plurality of phase states, and wherein said phase estimator is to determine a phase difference value corresponding to at least one phase state scheme, based on a combination of first and second detected power values, the first detected power value including a power value detected by the power detector when a first set of two different phase states are applied to said first and second RF chains, respectively, and the second detected power value including a power value detected by the power detector when a second set of two different phase states are applied to said first and second RF chains, respectively.

5. The apparatus of claim 4, wherein said at least one phase state scheme comprises switching said first and second RF chains to the same phase state.

6. The apparatus of claim 5, wherein the first set of phase states comprises the phase states of zero degrees and 90 degrees, and wherein the second set of phase states comprises the phase states of 90 degrees and zero degrees.

7. The apparatus of claim 4, wherein said at least one phase state scheme comprises switching said first and second RF chains to first and second phase states, which are separated by 180 degrees.

8. The apparatus of claim 7, wherein the first set of phase states comprises the phase states of 90 degrees and 180 degrees, and wherein the second set of phase states comprises the phase states of 180 degrees and 90 degrees.

9. The apparatus of claim 1 comprising:
a first coupler to couple said first RF chain to an input of said power detector; and
a second coupler to couple said second RF chain to the input of said power detector.

10. The apparatus of claim 1, wherein said first and second RF chains are connected to first and second adjacent antenna elements of a phased array antenna.

11. A system comprising:
a phased array antenna including a plurality of antenna elements connected to a respective plurality of Radio-Frequency (RF) chains; and
a built-in-self-test architecture including:
a plurality of power detectors coupled to a plurality of pairs of said RF chains; and
a phase estimator to estimate a phase difference between first and second RF chains of a pair of RF chains based on a combined power value detected by a power detector of the plurality of power detectors coupled to said pair of first and second RF chains responsive to simultaneous communication via both the first and second RF chains.

12. The system of claim 11, wherein said plurality of power detectors are intermittently connected between said plurality of RF chains such that each power detector of said plurality of power detectors is connected to a different pair of RF chains, and each of said RF chains is connected to two different power detectors.

13. The system of claim 12, wherein said plurality of RF chains include n RF chains, wherein said plurality of power detectors include n power detectors, wherein an i-th power detector, i=1 . . . n−1, is connected between RF chain i+1, and a RF chain i+1, and wherein an n-th power detector is connected between an n-th RF chain and a first RF chain.

14. The system of claim 11, wherein said plurality of power detectors are concatenated via a plurality of multiplexers.

15. The system of claim 11, wherein said phase estimator is to estimate said phase difference based on the combined power value and at least one chain power value detected by the power detector responsive to communication via only one of the first and second RF chains.

16. The system of claim 15, wherein said at least one chain power value comprises a first chain power value detected by the power detector responsive to communication via the first RF chain, and a second chain power value detected by the power detector responsive to communication via the second RF chain.

17. The system of claim 11, wherein said first and second RF chains are switchable between a plurality of phase states, and wherein said phase estimator is to determine a phase difference value corresponding to at least one phase state scheme, based on a combination of first and second detected power values, the first detected power value including a power value detected by the power detector when a first set of two different phase states are applied to said first and second RF chains, respectively, and the second detected power value including a power value detected by the power detector when a second set of two different phase states are applied to said first and second RF chains, respectively.

18. The system of claim 17, wherein said at least one phase state scheme comprises switching said first and second RF chains to the same phase state.

19. The system of claim 17, wherein said at least one phase state scheme comprises switching said first and second RF chains to first and second phase states, which are separated by 180 degrees.

20. The system of claim 11 comprising:
a first coupler to couple said first RF chain to an input of said power detector; and
a second coupler to couple said second RF chain to the input of said power detector.

21. A method comprising:
simultaneously communicating a radio-frequency (RF) signal via first and second RF chains; and
estimating a phase difference between said first and second RF chains based on a combined power value detected by a power detector, which is coupled between said first and second RF chains, responsive to the simultaneous communication via both the first and second RF chains.

22. The method of claim 21, wherein estimating said phase difference comprises estimating said phase difference based on the combined power value and at least one chain power value detected by the power detector responsive to communication via only one of the first and second RF chains.

23. The method of claim 22, wherein said at least one chain power value comprises a first chain power value detected by the power detector responsive to communication via the first RF chain, and a second chain power value detected by the power detector responsive to communication via the second RF chain.

24. The method of claim 21, wherein said RF chains are switchable between a plurality of phase states, and wherein estimating said phase difference comprises estimating a phase difference value corresponding to at least one phase state scheme, based on a combination of first and second detected power values, the first detected power value including a power value detected by the power detector when a first set of two different phase states are applied to said first and second RF chains, respectively, and the second detected power value including a power value detected by the power detector when a second set of two different phase states are applied to said first and second RF chains, respectively.

25. The method of claim 24, wherein said at least one phase state scheme comprises switching said first and second RF chains to the same phase state.

26. The method of claim 24, wherein said at least one phase state scheme comprises switching said first and second RF chains to first and second phase states, which are separated by 180 degrees.

27. A non-transitory product including a storage medium having stored thereon instructions that, when executed by a machine, result in:

estimating a phase difference between first and second Radio-Frequency (RF) chains based on a combined power value detected by a power detector, which is coupled between said first and second RF chains, responsive to simultaneous communication of a RF signal via both the first and second RF chains.

28. The product of claim 27, wherein estimating said phase difference comprises estimating said phase difference based on the combined power value and at least one chain power value detected by the power detector responsive to communication via only one of the first and second RF chains.

29. The product of claim 28, wherein said at least one chain power value comprises a first chain power value detected by the power detector responsive to communication via the first RF chain, and a second chain power value detected by the power detector responsive to communication via the second RF chain.

30. The product of claim 27, wherein said RF chains are switchable between a plurality of phase states, and wherein estimating said phase difference comprises estimating a phase difference value corresponding to at least one phase state scheme, based on a combination of first and second detected power values, the first detected power value including a power value detected by the power detector when a first set of two different phase states are applied to said first and second RF chains, respectively, and the second detected power value including a power value detected by the power detector when a second set of two different phase states are applied to said first and second RF chains, respectively.

* * * * *